United States Patent Office 3,838,101
Patented Sept. 24, 1974

3,838,101
REACTIONS BETWEEN AN ORGANIC DIIMIDE AND AN EPOXY RESIN WITH A CHROMIUM III TRICARBOXYLATE CATALYST
Roger B. Steele, Fair Oaks, Arthur Katzakian, Jr., and Joseph J. Scigliano, Sacramento, and Edward E. Hamel, Roseville, Calif., assignors to Aerojet-General Corporation, El Monte, Calif.
No Drawing. Continuation-in-part of abandoned application Ser. No. 28,122, Apr. 13, 1970. This application Nov. 21, 1972, Ser. No. 308,611
Int. Cl. C08g 30/14
U.S. Cl. 260—47 EN                           18 Claims

ABSTRACT OF THE DISCLOSURE

This patent discloses and claims the reaction of oxirane-containing compounds with primary cyclic imide-containing compounds, at temperatures of from about 0° C. to 225° C., in the presence of active chromium II tricarboxylate salts which have unoccupied coordination sites.

This is a continuation-in-part of application Ser. No. 28,122 filed 4/13/70 and now abandoned.

BACKGROUND OF THE INVENTION

Substantial interest in thermally stable polyimide, polyamideimide, and polyesterimide resins has been shown in recent years. Polyimides are characterized by high thermal stability, outstanding resistance to irradiation, to mechanical deformation at high temperatures, and to solvent attack, good hydrolytic stability, and an excellent balance of mechanical and electrical properties over a broad temperature range. Aromatic polyimides are superior to aliphatic polyimide compositions, in that they have higher heat stability.

The reaction product of pyromellitic dianhydride with bis(4-aminophenyl)ether is an example of a known aromatic polyimide having good thermal stability. This polyimide is stable to over 500° C. in vacuum or inert atmospheres, stable for over one year when stored in air at 275° C. retains toughness after one year in boiling water, and retains flexibility after 40 days exposure to a thermal neutron flux of $10^{13}$ neutrons/cm.$^2$/sec. at 175° C. The only known solvent for this polyimide is fuming nitric acid. The mechanical properties of glass reinforced composites using polyimide resins are generally good. Some such composites retain their flexural strength at 600° F. after extended aging at 600° F. and 100 hours at 700° F. in air. Commercially available polyimide glass cloth reinforced composites have been reported to retain mechanical properties after more than 10,000 hours storage at 400° F. and 500° F. in air. Polyamideimides are structurally similar to polyimides, but contain amide linkages to enhance processing characteristics. Polyesterimides exhibit good physical and electrical properties at high temperatures and a 20,000 hour service life at 230° C. The thermal and oxidative stabilities of such polymers are somewhat less than those of the best polyimides, but are still far superior to other current thermally stable polymers.

Polyimides, polyamideimides, and polyesterimides reported in the literature are prepared by either (1) melt or fushion techniques or (2) cyclization of soluble polyamic acid precursors. Regardless of the approach used, by-products are formed, volatile or otherwise. Diamines and tetraacids or diamines and diacid/diesters can be reacted by melt or fushion techniques to produce meltable polymeric polyimides wherein the backbone contains the imide linkages through the following route:

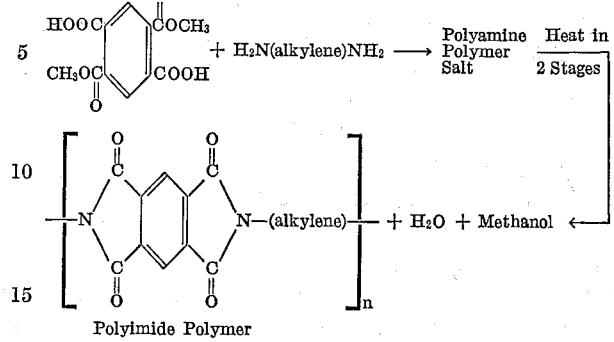

REACTION I
(Prior Art)

Polyimide Polymer

While here the Diacid/Diester is used, the tetraacid gives the same desired end product.

A more general method for the preparation of aromatic polimides and various aliphatic polyimides is now in wide use. This method involves the synthesis of a soluble polyamic acid, which can be converted to the polyimide by heating at elevated temperature.

These polyamic acids are prepared by the reaction of a dianhydride with a diamine, as shown below in Prior Art Reaction IIA.

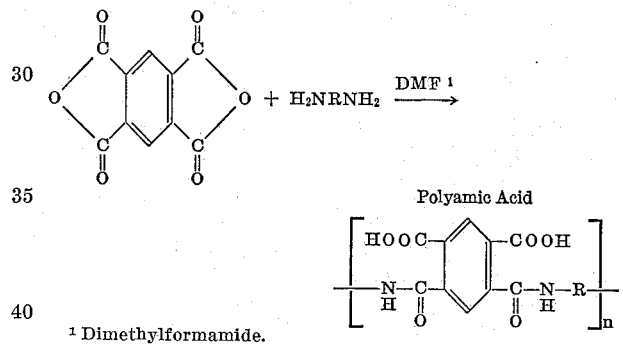

[1] Dimethylformamide.

First the polyamic acid solution is heated to remove solvent, and then elevated in temperature to about 300° C., at which complete cyclization occurs to form an insoluble polyimide and water.

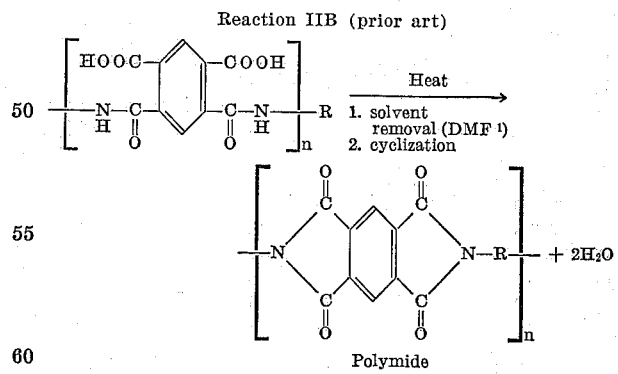

Reaction IIB (prior art)

Polymide

[1] Dimethylformamide.

R in IIA and IIB is an aliphatic group from 1–20 carbon atoms.

According to the present invention, it has been discovered that imide-oxirane reaction products can be produced by the reaction of primary cyclic mono, di- and polyfunctional imides with oxirane compounds in the presence of active chromium III salts having unoccupied coordination sites. These reactions proceed rapidly at temperatures above about 0° C., while state of the art polyimide preparation techniques require temperatures of at least about 300° C. In the instant invention there is no production of water or any other by-product.

The reactions of the instant invention may utilize either monofunctional or difunctional or higher functionality oxiranes and monofunctional, difunctional or higher functionality cyclic primary imides. The reaction is illustrated here by the use of a primary cyclic diimide with a difunctional oxirane, in the presence of an active chromium III catalyst.

Reaction III

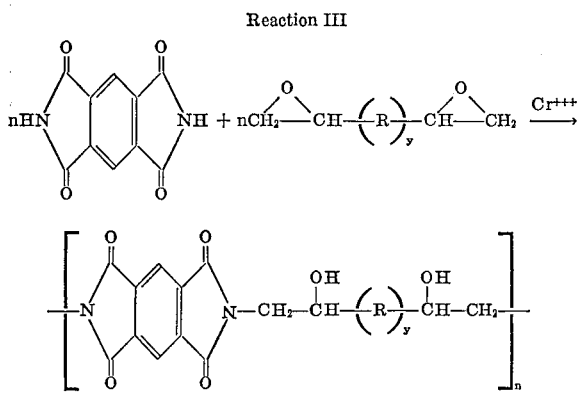

(No By-Products Formed)

where R is aliphatic, aromatic, cyclo aliphatic, aralkyl, alkaryl as well as the above moieties with non-reactable substituents such as halogens, cyano, ether, amide, imide, etc., thereupon and $y$ is 1 or 0, and $n$ is an integer of at least 2.

Since no by-products are evolved, these polymers are amenable to standard bag molding techniques for preparing fiber reinforced structures, thus reducing fabrication costs and opening the application of these polymers to large structures. These polymers are also useful as adhesives, where the absence of by-products eliminates the need for high pressure for bonding. They can also be used in simple potting operations where only heat is required to obtain even large castings for encapsulation of electronic components.

SUMMARY OF THE INVENTION

In brief, this invention comprises the method of reacting oxirane-containing compounds with imide-containing compounds, at from about 0° C. to 225° C., in the presence of active chromium III tricarboxylate salts which have unoccupied coordination sites.

The major object of the present invention is to provide a novel chromium catalyst for use in the reaction of oxirane oxygen compounds and imide moieties.

Another major object of the invention is to provide a novel chromium catalyst for the preparation of polyimides, and polyesterimides at lower temperatures without the evolution of volatiles.

More particularly, it is an object of our present invention to provide a novel chromium catalyst for the reaction of imide-oxirane systems at temperatures below about ambient.

These and other objects and advantages of this invention will be apparent from the more detailed description which follows.

Chromium salts having oxidation states of chromium varying between one and six are known. Chromium III is the most stable and important oxidation state of the element and has six coordination sites arranged in an octahedral configuration about the central ion. The coordination sites of chromium III account for the existence of stable complex ions such as the hexaaquochromium ion and the hexaaminochromium ion. In both of the above examples the water and ammonia, commonly called ligands, occupy the six coordination sites of chromium III. Ligands may be electrically neutral, as in the cases of water and ammonia, or negatively charged as in the case of the cyanide ion which gives rise to the negatively charged hexacyanochromium ion. Chelating agents, such as the acetylacetonate anion, also form exceedingly stable chromium chelates in which all of the chromium III coordination sites are occupied. The removal of the above-mentioned ligands from the chromium III ion or the displacement of these ligands by other ligands is an extremely difficult and slow process. It is largely because of this kinetic inertness that so many complex chromium III species can be isolated and that they persist for relatively long periods of time in solution, even under conditions where they are thermodynamically quite unstable. Thus, the normally occurring form of chromium III compounds is the fully coordinated state. The kinetic stability of its widely found complex coordination compounds sets the chromium III ion apart from most other trivalent transition metal ions. We have found that the commonly occurring fully coordinated chromium III carboxylates are poor catalysts for imide-oxirane reactions. Quite surprisingly, however, we have found that chromium III in an uncoordinated state is a superior catalyst for such reactions.

The preferred chromium III tricarboxylate salts are those in which three of the six coordination sites on chromium III are unoccupied and are thus available to participate in catalysis of the imide-epoxy reaction. Three chromium III coordination sites are occupied by the carboxylate anions to produce a neutral molecule; the remaining three sites being unoccupied. The alkyl side chain of the carboxylate anions may be adjusted in order to effect the necessary solubility in various reaction media necessary for efficient catalysis.

While not bound by any theory, it is believed that the catalysis of the imide-epoxy reaction by $Cr(OCOR)_3$ is based on the transient occupation of the available chromium III coordination sites by an epoxide and an imide molecule. This unique activated complex places the epoxide and the imide in the proper environment for reaction to occur. The catalyst is regenerated and thus is able to participate in further reactions. Reference is made to the equation of Reaction IV below.

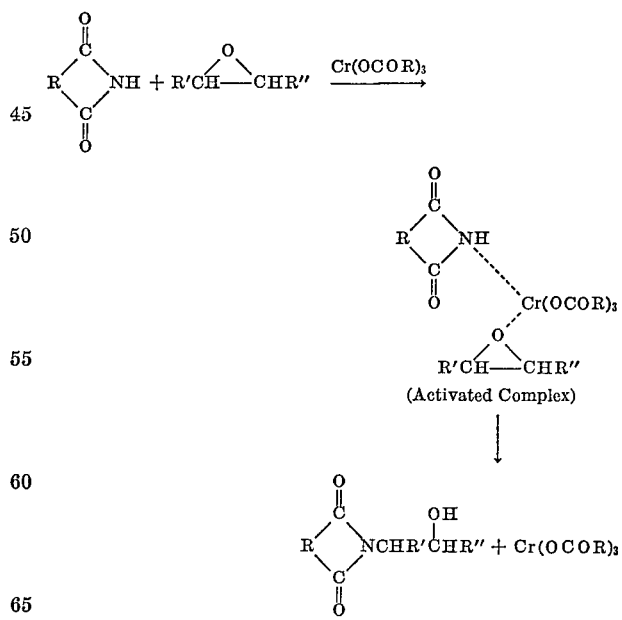

R, R' and R'' have the same significance here as R does in Reaction III, and that R, R' and R'' may be the same or various combinations of those moieties represented by R in Reaction III.

DESCRIPTION OF PREFERRED EMBODIMENTS

The active chromium III salt preparation is illustrated as follows. A solution of 120 g. (3.0 moles) of sodium hydroxide was dissolved in 500 ml. of distilled water.

2-Ethylhexanoic acid (491 g., 3.3 moles) was added with stirring to form sodium 2-ethylhexanoate. In a separate container, 200 g. (0.5 mole) of chromium nitrate nonahydrate was dissolved in 500 ml. of distilled water. The chromium nitrate solution was slowly added to the sodium 2-ethylhexanoate solution with good stirring. When the addition was complete, 500 ml. of hexane were added and stirring was continued for 10 minutes. The layers were separated and the hexane layer containing the aquated chromium III tri-2-ethylhexanoate was washed with dilute sodium hydroxide solution, water, dilute sodium carbonate solution and finally with distilled water. The hexane solution was then dried over anhydrous magnesium sulfate. Most of the hexane was removed under reduced pressure and the resulting concentrate was slowly added to 500 ml. of acetone. The resulting blue granular solid was filtered and air dried to yield 130 g. (54%) of aquated chromium tri-2-ethylhexanoate. Molecular weight determination indicated that the compound is polymeric in nature, probably due to the oxygen bridging of chromium atoms.

Anal.—Calcd for $C_{24}H_{51}O_9Cr$: C, 53.8; H, 9.6; Cr, 9.7. Found: C, 53.2; H, 8.7; Cr, 9.4. Azeotropic data indicated three molecules of water per chromium atom.

A stock solution of 5.0 g. of aquated chromium tri-2-ethylhexanoate and 2.5 g. of 2-ethylhexanoic acid in chloroform was prepared. Ten-ml. aliquots of this solution were transferred to each of ten 50-ml. volumetric flasks and placed in a 140° oven for 0 (control), 0.5, 1.5, 3 and 6 hours. After each time interval two of the flasks were removed from the oven. One was diluted to the mark with carbon tetrachloride and the conversion from aquated to active chromium tri-2-ethylhexanoate was determined by measuring the absorption intensity of the solution at 2750 millimicrons. It was determined that fully aquated chromium tri-2-ethylhexanoate absorbs strongly at 2750 millimicrons while the active deaquated chromium compound does not absorb at this wave-length. The conversion from catalytically inactive fully coordinated aquo chromium tri-2-ethylhexanoate to the active form is about 44% complete after 6 hours. Furtherr heating at 200° C. with the addition of 2-ethylhexanoic acid raises the conversion to about 90%.

Once the necessary coordination sites on chromium III have been freed for catalyst participation, care must be taken to insure catalyst activity during the reaction. Inert solvents such as benzene, toluene, methylisobutyl ketone etc., are acceptable. Electron donating solvents such as methanol, ethanol, dimethylformamide, dioxane and tetrahydrofuran, however, were found to retard catalysis at temperatures on the order of room temperature. These electron donating solvent molecules tend to strongly solvate the chromium III metal ion, blocking the transient residence of the imide-epoxy reagents on these sites and thus preventing reaction catalysis.

In general, the chromium III tricarboxylate salts are prepared by the reaction of an aquated inorganic chromium III salt such as aquated chromium nitrate with three moles of sodium carboxylate Reaction V

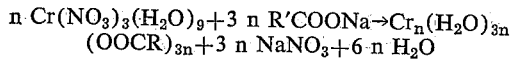

(R' is the same as defined in Reaction III)

The chromium III salt obtained by this method is catalytically inactive since the six chromium III coordination sites are occupied both by the water and carboxylate anions. In order to produce the active catalyst, the aquated form must be subjected to a high temperature, acid catalyzed process in which the coordination sites are freed of water.

Recation VI

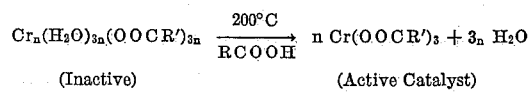

(Inactive)    (Active Catalyst)

In the above equations, R' is a monovalent organic radical such as alkyl, aryl, alkaryl or aralkyl, and preferably contains from 1 to about 20 carbon atoms.

The anion (negatively charged) portion of the catalyst is also critical to its activity in the sense that it may not cause complete coordination. For example, if the carboxylate anion is replaced by the acetylacetonate anion the resulting chromium III acetylacetonate is catalytically inactive under the low temperature range of our test conditions. The reason for this is that the acetylaccetonate groups effectively occupy all of the chromium III coordination sites.

Recation VII

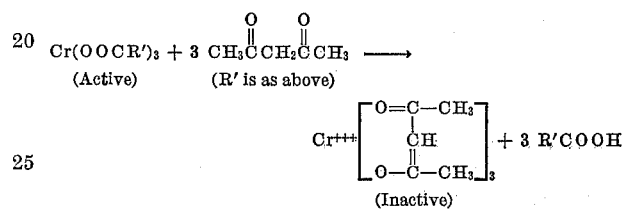

(Inactive)

The invention is applicable to any oxirane oxygen compounds including ethylene oxide, 1,2-propylene oxide, 1,2-butylene oxide, 2,3-butylene oxide, 1,2-epoxyhexane, cyclohexene oxide, cyclopentene oxide, cyclopentadiene monoxide and the like. The invention is particularly adapted to the reaction of any epoxyalkanes or epoxycycloalkanes, typically containing from 2 to about 20 carbon atoms, with organic imides. Other oxiranes utilizeable include styrene oxide, 1,2,3,4-diepoxy butane, 1,2,5,6-diepoxy hexane, diepoxide of divynyl benzene, and the like.

The polyepoxide materials for use in the invention include organic materials having a plurality of reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like. The more common types of polyfunctional oxiranes are derived from the reaction of epichlorohydrin or other halohydrins with 2,2-di(p-hydroxyphenyl) propane, the glycidyl ether of mononuclear di- and trihydroxyl phenols (resorcinol, hydroquinone, pyrocatechol, saligenin and phloroglucinol), the glycidyl ether of other polyhydroxy phenols (Bisphenol F, trihydroxyldiphenyl dimethyl methane, 4,4'-dihydroxy biphenyl, tetrakis hydroxyphenyl ethane, long-chain bisphenols, dihydroxy diphenyl sulfone, and Novolacs), the glycidyl ethers of polyalcohols (ethylene glycol, 1,4-butanediol, glycerol, erythritol, and polyglycols), and the epoxylated cyclic and straight chain olefins (vinyl cyclohexene, dicyclohexene carboxylate, and polybutadienes). These and many other epoxy resins are commercially available.

The present invention is also applicable to epoxy resins which may be reacted in the presence of the active trivalent chromium catalysts with the imides. Typical epoxy resins suitable in the practice of the present invention are those disclosed in U. S. Pats. Nos. 2,500,600 and 2,324,433 as well as those set forth in our co-pending application, Ser. No. 218,015 filed Jan. 14, 1972 in the name of Katzakian et al., the disclosures of which are expressly incorporated herein by reference. While not limited thereto, the epoxy resins of the present invention normally have epoxy equivalent weight values of from about 100 up to 4000 or higher.

According to this invention the oxiranes can be reacted with any primary cyclic imide. The imide may be monoor polyfunctional and may be a low molecular weight monomeric material or an intermediate molecular weight liquid prepolymeric material, this latter suitably having a molecular weight from 1,000 to 5,000.

Utilizeable cyclic imides for the practice of this invention, are those of the formulae:

(A) 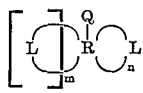

and (B) 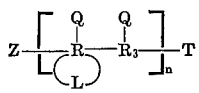

wherein L represents an imide moiety

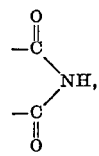

$m$ is a number of either 0 or 1, and $n$ is at least 2.

When $m=0$, R represents a moiety selected from the group consisting of:

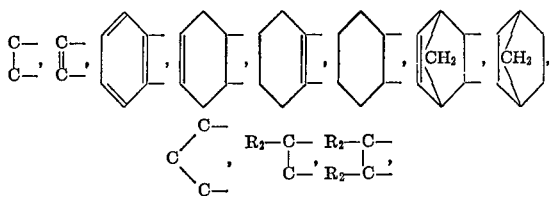

when $m=1$, R represents a moiety selected from the group consisting of:

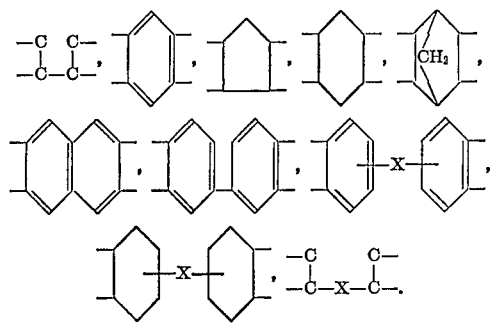

X represents a group selected from the group consisting of:

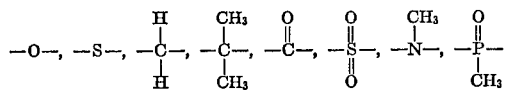

Each $R_2$ represents the same or different group selected from the group consisting of alkyl ($C_1$ to $C_{10}$), alkenyl ($C_1$ to $C_{10}$), cycloalkyl wherein there are 4 to 8 carbon atoms in the ring, aryl, alkaryl, and aralkyl;

Q represents those valences on R which, while understood to be filled with hydrogen atoms are available for substitution by non-interfering groups selected from among: —F, —Cl, —BR, —I, —OH, —NO$_2$, —SO$_2$CH$_3$, —OCH$_3$, —COOH, and —COOCH$_3$, —CN,

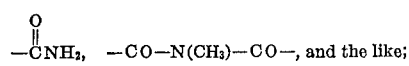

Z represents either, a group derived from an ionic or free radical polymerization initiator, or H;

T represents a terminal group derived from an ionic or free radical polymerization initiator, when Z is not H; or when Z is H, a chain terminator group or H;

$R_3$ represents a moiety selected from the group consisting of

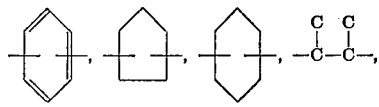

and wherein each bond depicted in the groups and moieties of R, X, $R_2$, $R_3$, and Q actually represents a half-bond in order to best illustrate points of attachment.

Typical of those of Formula A are the following when $m=0$: succinimide, maleimide, phthalimide, 4-tetrahydrophthalimide, Δ, 4 tetrahydrophthalimide, hexahydrophthalimide, mono- and dichloromaleimide, dodecenylsuccinimide glutarimide.

And when $m=1$: 1,2,4,5-benzenetetracarboxylic diimide, 1,2,3,4-cyclopentanetetracarboxylic diimide, 3,4,3',4'-diphenyldimethylmethanetetracarboxylic diimide, 3,4,3',4'-diphenylethertetracarboxylic diimide, 3,4,3',4'-benzophenetetracarboxylic diimide, 1,2,3,4 - butanetetracarboxylic diimide, barbituric acid.

Compounds with Q substituents are as follows: 1,4-difluoro - 2,3,5,6 - benzenetetracarboxylic diimide, 2,2'-diphenoxy-3,4,3',4'-diphenylethertetracarboxylic diimide, 2,2' - dicyano-3,4,3',4'-benzophenonetetracarboxylic diimide.

Imide terminated prepolymers may be prepared by the reaction of excess diimide with isocyanate terminated materials such as dimeryldiisocyanate or toluene diisocyanate (TDI). Imide terminated prepolymers can also be prepared by reaction of excess diimide with polyfunctional acid chlorides such as those of dimer or trimer acid chloride.

Compounds such as 4-carboxyphthalimide can be reacted with aliphatic diamines to produce amideimides which are, in turn, reacted with diepoxides to prepare polyamideimides. The overall reaction is as follows with the reaction of I + oxirane being carried out in the presence of the catalyst of this invention.

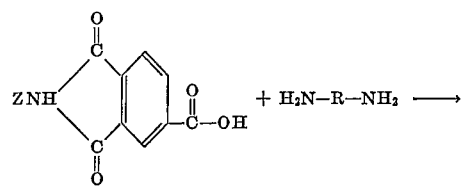

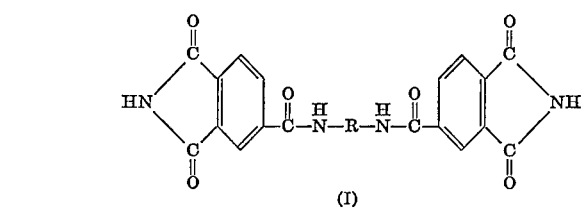

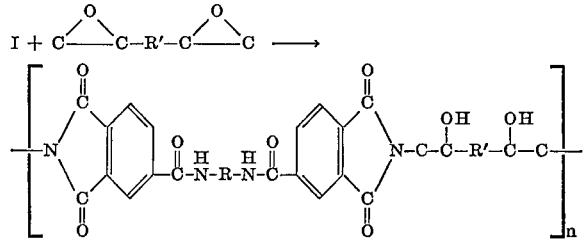

wherein R and R' are divalent organic radicals such as phenylene, ethylene, biphenylene, xylylene and the like, and $n$ is at least 2.

In the practice of the invention, the catalytically active trivalent chromium compound is used in an effective catalytic amount, of from about 0.1 to about 10% by weight of the reactants with an epoxy resin or other oxirane oxygen compound(s) and the imide(s).

EXAMPLE I

Preparation of N-2-hydroxyethyl phthalimide

N-2-Hydroxyethyl phthalimide was prepared by allowing 147.2 g. (1.0 mole) of phthalimide to react in an autoclave with 53.0 g. (1.20 moles) of ethylene oxide in the presence of 1.47 g. (1%) of active chromium III tri-2-ethylhexanoate (COT) and 400 ml. of methyl isobutylketone (MiBK) at 160 to 165° C. for two hours. On cooling, the N-2-hydroxyethyl phthalimide crystallized and was collected by filtration. A 94.7% yield of the hydroxethyl imide was obtained. Under identical experimental conditions but in the absence of COT, the starting material was recovered unchanged.

EXAMPLE II

Preparation of N-2-hydroxyethyl succinimide

N-2-Hydroxyethyl succinimide was prepared by reacting 49.5 g. (0.5 mole) of succinimide with 26.5 g. (0.60 mole) of ethylene oxide in the presence of 0.49 g. (1%) of active chromium III tri-2-ethylhexanoate and 400 ml. of methylisobutyl ketone for two hours at 160 to 165° C. in an autoclave. N-2-Hydroxyethyl succinimide was obtained by filtration in 87.5% yield. The reaction did not proceed in the absence of COT.

EXAMPLE III

Preparation of 3-(2-hydroxyethyl)-5,5-dimethylhydantoin

3 - (2 - Hydroxyethyl)5,5-dimethylhydantoin was prepared via the reaction of 12.8 g. (0.1 mole) of 5,5-dimethylhydantoin with 10.6 g. (0.24 mole) of ethylene oxide in the presence of 0.12 g. (1%) of active chromium III tri-2-ethylhexanoate and 300 ml. of MiBK in an autoclave for three hours at 155 to 157° C. The hydroxyethylhydantoin was obtained in 42% yield via filtration.

In the absence of the catalyst the starting materials were recovered unchanged.

EXAMPLE IV

Preparation of 3-(2-hydroxy-2-phenylethyl)-5,5-dimethylhydantoin and 3-(2-hydroxycyclohexyl)-5,5-dimethylhydantoin The above-named compounds were prepared via the reaction of 5,5-dimethylhydantoin with styrene oxide and cyclohexene oxide in 60.5 and 34.1% yields, respectively. The reaction conditions and active chromium III tri-2-ethylhexanoate concentration were identical to those used in the preparation of 3-(2-hydroxyethyl)-5,5-dimethylhydantoin.

EXAMPLE V

Preparation of poly($\beta$-hydroxyalkyl imides)

a. Reaction of Pyromelliticdiimide with Dow Epoxy Resin-332 (DER–332):[2] Pyromelliticdiimide (5.4 g., 0.05 equivalent) was mortar ground with 8.8 g. (0.05 equivalent) of DER–332 and 0.2 g. active chromium III trioleate. The viscous liquid cured to a rigid polymer in 15 minutes at 200° C. Under identical experimental conditions but in the absence of chromium trioleate no reaction occurred and the sample remained liquid.

b. Reaction of Pyromelliticdiimide with Reichold Triepoxide 427–61:[3] Pyromelliticdiimide (5.4 g., 0.05 equivalent) and 8.1 g. (0.05 equivalent) of Reichold Triepoxide were ground in a mortar with 0.4 g. of active chromium III tri-2-ethylhexanoate. The viscous liquid cured to a rubbery solid in 15 minutes at 200° C. No reaction was observed in the absence of COT.

c. Reaction of Pyromelliticdiimide with Union Carbide Diepoxide 201:[4] Pyromelliticdiimide (5.4 g., 0.05 equivalent) was ground in a mortar with 7.5 g. (0.5 equivalent) of Diepoxide 201 and 0.2 g. of active chromium III trioleate. The viscous liquid cured to a rigid solid in 15 minutes at 200° C. No reaction in the absence of active chromium III trioleate was observed.

EXAMPLE VI

Preparation of bis-2-hydroxyethyl pyromelliticdiimide

Bis-2-hydroxyethyl pyromelliticdiimide was prepared by reacting 25.0 g. (0.1155 mole) of pyromelliticdiimide with 10.1 g. (.23 moles of ethylene oxide in the presence of 0.5 g. (2%) of active chromium III tri-2-ethylhexanoate in 300 ml. of methylisobutylketone.

The bis-2-hydroxyethyl pyromelliticdiimide was obtained by filtration in 20.0% yield. In the absence of the catalyst no reaction was observed to take place.

EXAMPLE VII

Reaction of 4-carboxyphthalimide with ethylene oxide

One mole of 4-carboxyphthalimide was reacted with two moles of ethylene oxide and a 0.4% solution of the catalyst of Example I in methyl isobutyl ketone at 130° C. in a stainless steel pressure vessel. After 1.5 hours, the reaction appeared complete as evidenced by the absence of insoluble carboxyimide. Removal of the solvent gave a green residue which was easily crystallized from water. Repeated crystallizations from water and acetone-hexane mixtures gave a constant melting (176–177° C.), white solid. The infrared spectrum of the material revealed the presence of a hydroxyl band at 3300 cm.$^{-1}$ and the disappearance of the imide band.

EXAMPLE VIII

Reaction of cyclopentanetetracarboxylic diimide with epoxy resin

Cyclopentanetetracarboxylic diimide (CPDI) (5.2 g., 0.05 equivalent), Shell Epon Resin 154 (9.0 g., 0.05 equivalent) and 0.04 g. (0.3%) of active chromium III tri-2-ethylhexanoate (COT) were ground together in a mortar and placed in an oven at 230° C. After 5 min. a clear hard polyimide formed. The progress of the reaction was followed by infrared spectroscopy which showed disappearance of the imide N—H band and appearance of the OH band as the reaction progressed. In the absence of catalyst, gellation had not occurred in 20 min. at 230° C. After 16 hours at 230° C. the uncatalyzed sample hardened but the sample was opaque due to unreacted cyclopentanetetracarboxylic diimide.

EXAMPLE IX

Reaction of benzophenone tetracarboxylic diimide with epoxy resin

Benzophenone tetracarboxylic diimide (BTDI) (8.0 g., 0.5 equivalent), Dow Epoxy Resin 332 (8.8 g., 0.05 equivalent) and 0.04 g. (0.3%) active chromium III tri-2-ethylhexanoate were ground together in a mortar and then cured at 150° C. After 30 min. the material polymerized to a rigid mass having high strength. An uncatalyzed sample was still liquid after 8 hours at 150° C.

EXAMPLE X

Reaction of maleimide with epoxy resin

Maleimide (19.4 g., 012 equivalents), Dow Epoxy Resin 332 (35.0 g., 0.2 equivalents) and 0.275 g. active chromium III tri-2-ethylhexanoate (0.5%) were heated in a beaker until a clear solution of the bis-2-hydroxy imide resulted. To this clear solution was added 0.055 g. (0.1%) of azobis-isobuteryl nitrile (AIBN). Heating the resulting solution for 2 hours at 150° C. provided a durable rigid polymer. In the absence of catalyst the reaction of maleimide with epoxide did not proceed.

---

[2] Epichlorohydrin adduct of bis-phenol A.
[3] Epichlorohydrin adduct of trimethylolpropane.
[4] Bis-cyclohexene oxide carboxylate.

EXAMPLE XI

Reaction of tetrahydrophthalimide with epoxy resin

Tetrahydrophthalimide (30.2 g., 0.1 mole), Dow Epoxy Resin 332 (17.5 g., 0.1 equivalent) and 0.32 g. active chromium III tri-2-ethylhexanoate were heated on a hot plate until formation of the *bis*-2-hydroxy imide occurred as noted by a clearing of the solution. To this solution was added (0.1%) of t-butyl peroxide. After heating for one hour at 150° C. a hard polyimide formed, by crosslinking through the double bonds. In the absence of catalyst, the bis-hydroxy imide did not form.

EXAMPLE XII

Reaction of 4-carboxyphthalimide with ethylene oxide

Into a stainless steel bomb (90 ml.) were placed 4-carboxyphthalimide (4.76 g., 0.025 mole), a 0.4% solution of active chromium III tri-2-ethylhexanoate (0.18 g.) in methylisobutyl ketone (45 ml.), and ethylene oxide (2.4 g., 0.0545 mole). The bomb was sealed and placed in a 135° C. oven for 4 hours with shaking at 10 minue intervals in order to insure homogeneous conditions. After cooling, the bomb was opened and the clear, green solution was evaporated to dryness under reduced pressure at 50° C. The resulting solid was triturated with ether and filtered to yield a crude product (5.0 g.) in 72% yield. Two recrystallizations from water and two from ethylene dichloride gave a product (2.8 g.) in 40% yield melting at 125° C. The chromium (III) catalyzed reaction of two moles of ethylene oxide with 4-carboxyphthalimide occurs as follows:

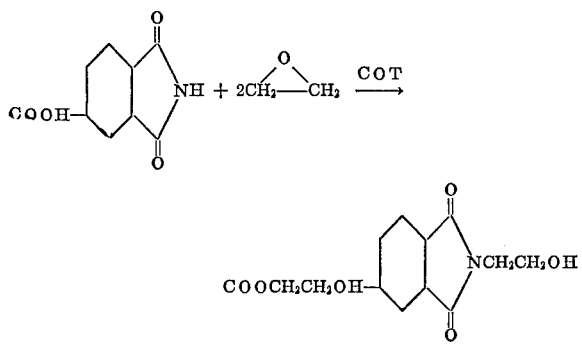

Infrared analysis revealed a hydroxyl band (3300 cm.$^{-1}$) and the disappearance of the imide band. The NMR spectrum was consistent with the *bis* adduct.

*Anal.*—Calcd. for $C_{13}H_{13}NO_6$: C, 55.9; H, 4.69; N, 5.02. Found: C, 55.4; H, 4.98; N, 5.13.

EXAMPLE XIII

Reaction of 4-carboxyphthalimide with epoxy resin

4-Carboxyphthalimide (191) g., 1 mole), Shell Epon Resin 152, a phenol novolac containing epoxy groups (350 g., 2 equivalent) and 1.62 g. of active chromium III tri-2-ethylhexanoate (0.3%) were heated at 150° C. for 3 hours at which time the material polymerized to a tough rigid polyesterimide. In the absence of catalyst, no reaction occurred.

EXAMPLE XIV

Reaction of pyromellitic diimide with epoxy resin

A qualitatively good product was obtained by reacting Ciba's diepoxide 1389 (a resorcinol diglycidyl ether) with pyromellitic diimide (PMDI).

Epon 152 was also reacted with pyromellitic diimide. Bulk castings showed that at 100, 125 and 150 equivalents of Epon 152/100 equivalents of pyromellitic diimide improvement in thermal stability as determined by Thermal Gravimetric Analysis was obtained. Storage of these specimens at 250° C. showed that gassing was virtually non-existent.

EXAMPLE XV

Reaction of tetrahydrophthalimide with 1,2-propylene oxide at 0° C. in acetone solution

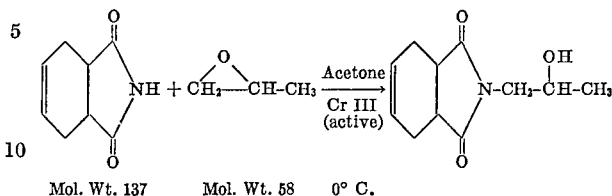

Mol. Wt. 137   Mol. Wt. 58   0° C.

Materials:
  Chromium III Tri-2-Ethylhexanoate as needed
  3.43 g. (0.025 m.) Tetrahydrophthalimide
  1.45 g. (0.025 m.) 1,2-Propylene Oxide
  Acetone to make 100 ml. Solution Procedure: Three solutions of the above composition were prepared having respectively 0, 1 and 2% Chromium III Tri-2-Ethylhexanoate. These solutions were prepared in 100 ml. volumetric flasks which were kept at 0° C. in an ice-water bath. Five ml. aliquots were taken at various time intervals and titrated for unreacted imide with 0.25N alcoholic KOH using a pH titrimeter.

Results:

| 0% chromium III tri-2-ethylhexanoate | | 1% chromium III tri-2-ethylhexanoate | | 2% chromium III tri-2-ethylhexanoate | |
|---|---|---|---|---|---|
| Elapsed time, min. | Percent imide reacted | Elapsed time, min. | Percent imide reacted | Elapsed time, min. | Percent imide reacted |
| 0 | 0 | 0 | 0 | 0 | 0 |
| 50 | 0 | 40 | 2 | 40 | 9 |
| 110 | 0 | 100 | 24 | 100 | 50 |
| 155 | 0 | 145 | 34 | 145 | 59 |
| 215 | 0 | 205 | 45 | 205 | 66 |
| 275 | 0 | 265 | 47 | 265 | 69 |
| 1,115 | 0 | 1,105 | 66 | 1,105 | 85 |
| 1,300 | 0 | 1,290 | 69 | 1,290 | 86 |

The table above illustrates the catalytic activity of the active chromium III tri-2-ethylhexanoate, for a typical oxirane-primary cyclic imide reaction of 0° C.

A plot graphically illustrating the relationship of catalyst concentration, and the lack thereof on the above reaction is set forth below.

Reaction of Tetrahydrophthalimide (0.25 Molar) with 1,2 Propylene Oxide (0.25 Molar) in Acetone at 0° C.

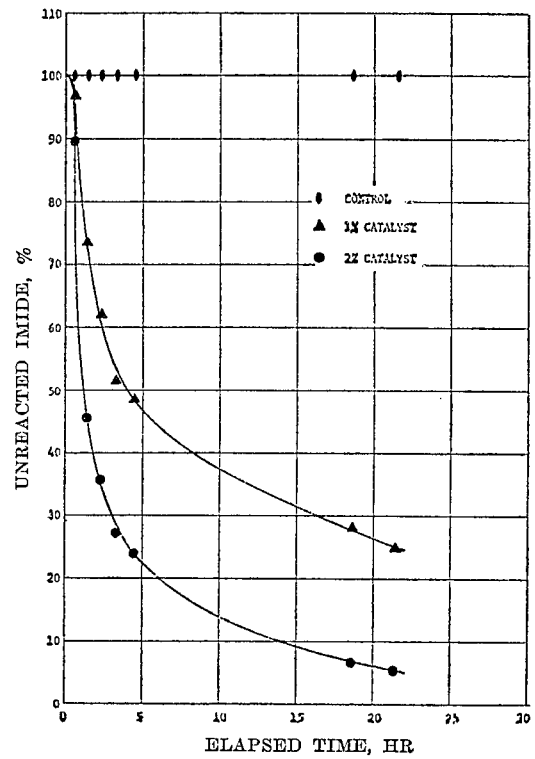

EXAMPLE XVI

Reaction of cyclopentanetetracarboxylic diimide with epoxy resin

The cyclopentanetetracarboxylic diimide when reacted with Epon 152 gave a polymer of superior thermal stability. The Thermal Gravimetric Analysis' curve indicated a 5% weight loss at slightly over 400° C.

The advantages of the present invention have been found to be obtained using any active trivalent chromium III tricarboxylate. Typical of such compounds, prepared as described above, are trivalent chromium hexanoate, trivalent chromium pentanoate, trivalent chromium butyrate, trivalent chromium 2-ethylhexanoate, trivalent chromium decanoate, trivalent chromium oleate, trivalent chromium 2-octenoate, trivalent chromium toluate, trivalent chromium cresylate, trivalent chromium benzoate, trivalent chromium alkylbenzoates and trivalent chromium alkoxybenzoates.

The polymers prepared in accordance with this invention are useful in films for wire and cable wrap, motor insulation, surface coatings, lacquers, textile fibers, adhesives, molding resins, fiber glass laminates for use in radomes, aircraft leading edge structures, nose fairings, high temperature deicer ducts, and turbine compressor blades, honeycombs, bearings for use with non-lubricating liquids, with corrosive substances at elevated temperatures, in areas where lubrication is essential but inconvenient, and as retainer rings for ball bearings, electrical conductive films, when coated with tin and indium, and temperature resistant foams.

EXAMPLE XVII

Reaction of cyclopentanetetracarboxylic diimide with epoxy resin

The cyclopentanetetracarboxylic diimide when reacted with Epon 152 stoichiometrically in the presence of active chromium III tri-2-ethylhexanoate (0.3%) gave a polymer of superior thermal stability. Thermal Gravimetric Analysis' curve indicated a 5% weight loss at slightly over 400° C. for the cured polymer.

EXAMPLE XVIII

Reaction of primary cyclic polyimide with diepoxide catalyzed with active chromium tri-2-ethylhexanoate The primary cyclic polyimide was derived from Gantrez AN (low molecular weight copolymer of maleic anhydride and methyl vinyl ether, $\eta_{sp}$[5] 0.1–0.5) by first dissolving the material in excess aqueous ammonia, evaporating to dryness and cyclizing to the primary imide under vacuum (25 mm. Hg) at 135° C. for 48 hours. At this time the final weight was slightly less than the weight of the Gatrez AN at the beginning. Imide formation was confirmed by I.R. (infra red), showing a characteristic imide absorption at 3200 cm.$^{-1}$. This material was ground to a fine powder.

The following two samples were prepared to illustrate the catalytic effect of active chromium III tricarboxylates on the reaction of primary cyclic polyimides with polyfunctional oxirane compounds:

| Materials | Grams #1 | #2 |
|---|---|---|
| Primary cyclic polyimide | 2.5 | 2.5 |
| DER 332 [1] | 2.5 | 2.5 |
| Active chromium III tri-2-ethylhexanoate | | 0.1 |

[1] Diglycidyl ether of bisphenol A.

Procedure: Each sample was well blended and placed into a 150° C. oven for four hours.

---
[5] The specific viscosity is determined on a solution of 1 gm. copolymer in 100 ml. of methyl isobutyl ketone at 25° C.

Results: The chromium catalyzed sample cured to a hard infusible solid, whereas, the uncatalyzed sample was still liquid.

EXAMPLE XIX

Comparison of reactivities of cyclic and linear primary imides with oxiranes both uncatalyzed and catalyzed wherein the catalyst is active chromium tri carboxylate Reactants:

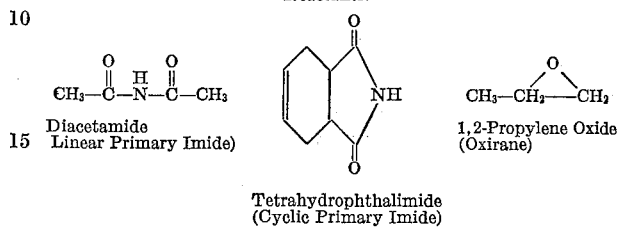

Diacetamide (Linear Primary Imide)

Tetrahydrophthalimide (Cyclic Primary Imide)

1,2-Propylene Oxide (Oxirane)

Catalyst: Active Chromium III Tri-2-Ethyl Hexanoate
Solvent: Chloroform (Spectro Grade)
Expected Reactions:

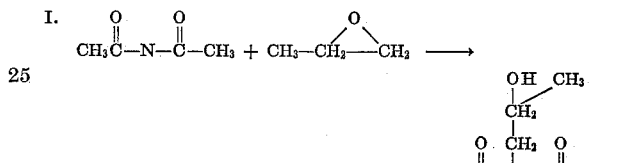

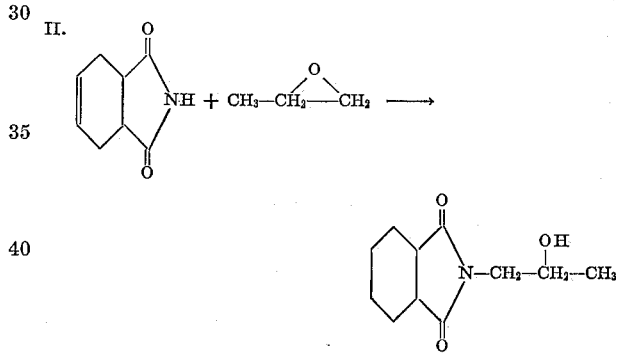

| Solution | Ia | Ib |
|---|---|---|
| Diacetamide | 0.50 g. (0.005 m.) | 0.50 g. (0.005 m.) |
| 1,2-propylene oxide | 0.30 g. (0.005 m.) | 0.30 g. (0.005 m.) |
| Active Cr III tri-2-ethylhexanoate | | 0.1 g. |
| Chloroform | To make 10 ml. total solution. | To make 10 ml. total solution. |

| Solution | IIa | IIb |
|---|---|---|
| Tetrahydrophthalimide | 0.76 g. (0.005 m.) | 0.76 g. (0.005 m.) |
| 1,2-propylene oxide | 0.30 g. (0.005 m.) | 0.30 g. (0.005 m.) |
| Active Cr III tri-2-ethylhexanoate | | 0.1 g. |
| Chloroform | To make 10 ml. total solution. | To make 10 ml. total solution. |

Kinetic Method: The reactions were run at 26° C. The rates were followed by infrared analysis using the characteristic absorptions for the imide >N—H (3210 cm.$^{-1}$) and the alcohol —OH (3460 cm.$^{-1}$). The appearance of the alcohol was used as a measure of the disappearance of the oxirane. The disappearance of the imide, of course, was measured directly.

Results: For Solutions Ia and Ib, no apparent reaction could be detected in 140 hours at 26° C. No reaction could be detected for Solution IIa for a period of 24 hours. Solution IIb, however, was 27% complete in 5 hours and was 100% complete within 73 hours.

It is seen that when an attempt to react a typical commercially available primary linear imide with a common oxirane, which did successfully react with primary cyclic imides, in the presence of the instant catalyst, and under simliar conditions, that here no apparent reaction took place.

The advantages of the present invention have been found to be obtained using any active trivalent chromium III tricarboxylate. Typical of such compounds, prepared as described above, are trivalent chromium hexanoate, trivalent chromium pentanoate, trivalent chromium butyrate, trivalent chromium 2-ethylhexanoate, trivalent chromium decanoate, trivalent chromium oleate, trivalent chromium 2-octenoate, trivalent chromium toluate, trivalent chromium cresylate, trivalent chromium benzoate, trivalent chromium alkylbenzoates and trivalent chromium alkoxybenzoates.

The polymers prepared in accordance with this invention are useful in films for wire and cable wrap, motor insulation, surface coatings, lacquers, textile fibers, adhesives, molding resins, fiber glass laminates for use in radomes, aircraft leading edge structures, nose fairings, high temperature deicer ducts, and turbine compressor blades, honeycombs, bearings for use with non-lubricating liquids, with corrosive substances at elevated temperatures, in areas where lubrication is essential but inconvenient, and as retainer rings for ball bearings, electrical conductive films, when coated with tin and indium, and temperature resistant foams.

It should also be noted that one or more than one compound of each class of epoxides may be reacted with one or more than one imide. Thus a monomeric monofunctional oxirane could be used in conjunction with a polyfunctional polymeric epoxide, for example in this reaction. Similarly mono and diimides can be utilized together.

Furthermore, the curable mixtures of the invention may be mixed at any stage prior to the completion of the degree of reaction possible as limited by the amount of one of the reactants, with fillers, plasticizers, pigments, dyestuffs, flame-inhibitors, mould lubricants or the like. Suitable extenders and fillers are, for example, asphalt, bitumen, glass fibers, mica, quartz meal, cellulose, kaolin, ground dolomite, colloidal silica having a large specific surface (Aerosil) or metal powders, such as aluminum powder.

The curable mixtures may be used in the unfilled or filled state, if desired in the form of solutions or emulsions, as laminating resins, paints, lacquers, dipping resins, moulding compositions, coating compositions, pore fillers, floor coverings, potting and insulating compounds for the electrical industry, adhesives and the like, and also in the manufacture of such products.

It is to be further understood that while the oxirane compounds can be reacted with the imides throughout the range of from about 0° C. to 200° C., there are certain situations wherein a particular temperature range should be utilized thus, for instance, if one of the reactants contains heat sensitive groups such as carbon to carbon double bonds temperatures over about 50° C. should be avoided. The desired rate of catalysts can be achieved by the adjustment of catalyst level rather than by an increase in temperature.

Operating temperatures are determined by the temperature necessary to maintain mobility of the reactive constituents. Solvents help to maintain mobility and thereby allow low temperature reactions to be carried out. Rubbery end products are preferably prepared at temperatures below 75° C., though elevated temperatures give rise to equally satisfactory products with respect to certain physical properties.

When steel or aluminum sheets are joined to other steel or aluminum sheets with a typical oxirane-imide monomer composition which contains an active chromium III tricarboxylate, either with or without a pigment, and subjected to curing conditions (which vary with the reactants utilized), tough adhesive joints are formed. Typical compositions utilizeable herewith are those set forth in Examples XIV and XVI.

Also, organic intermediates suitable as building blocks for custom manufactured chemicals useful for plasticizers, polymers, and perhaps pharmaceuticals include the reaction products of monofunctional oxiranes with primary cyclic monoimides.

Since certain changes may be made in the above compositions and processes without departing from the scope of the invention herein involved, it is intended that all matter contained in the above description shall be interpreted as illustrative and not in a limiting sense.

We claim:

1. A method of catalyzing the reaction of a primary cyclic diimide with an oxirane oxygen compound which is an epoxy resin, which method comprises carrying out the reaction in the presence of an effective catalytic amount of an active chromium III tricarboxylic having unoccupied coordination sites, catalyst, at from about 0° C. to 200° C.

2. A method of catalyzing the reaction of a primary cyclic diimide with an oxirane oxygen compound which is an epoxy resin, which process comprises carrying out the reaction at temperatures from about 0° C. to 50° C. in the presence of an effective catalytic amount of an active chromium III tricarboxylate having unoccupied coordination sites, catalyst in the presence of an inert solvent.

3. A method of catalyzing the reaction of a primary cyclic diimide with an oxirane oxygen compound which is an epoxy resin, which process comprises carrying out the reaction in the presence of an effective catalytic amount of chromium III 2-ethylhexanoate having unoccupied coordination sites catalyst.

4. The method of claim 1 wherein the epoxy resin is an epichlorohydrin adduct of bisphenol A.

5. The method of claim 1 wherein the diimide is selected from the group consisting of pyromelliticdiimide, bis-2-hydroxyethyl pyromelliticiimide, cyclopentanetetracarboxylic diimide, and benzophenone tetra carboxylic diimide.

6. The method of claim 2 wherein the diimide is selected from the group consisting of pyromelliticdiimide, bis-2-hydroxyethyl pyromelliticdiimide, cyclopentanetetracarboxylic diimide, and benzophenone tetra carboxylic diimide.

7. The method of claim 3 wherein the diimide is selected from the group consisting of pyromelliticdiimide bis-2-hydroxyethyl pyromelliticdiimide, cyclopentanetetracarboxylic diimide, and benzophenone tetra carboxylic diimide.

8. The method of claim 1 wherein the epoxy resin is selected from the group consisting of epihalohydrin adducts of bisphenol A, epihalodydrin adducts of trimethylolpropane, epoxidized novolacs, and the diglycidyl ethers of resorcinol.

9. The method of claim 2 wherein the epoxy resin is selected from the group consisting of epihalohydrin adducts of bisphenol A, epihalohdyrin adducts of trimethylolpropane, epoxidized novolacs, and the diglycidyl ethers of resorcinol.

10. The method of claim 3 wherein the epoxy resin is selected from the group consisting of epihalohydrin adducts of bisphenol A, epihalohydrin adducts of trimethylolpropane, epoxidized novolacs, and the diglycidyl ethers of resorcinol.

11. The method of claim 1 wherein the active chromium III tricarboxylate catalyst is selected from the group consisting of the active trivalent chromium alkanoates wherein each alkyl group contains from 1 to 20 carbon atoms; benzoate; alkylbenzoates; and alkoxybenzoates.

12. The method of claim 2 wherein the active chromium III tricarboxylate catalyst is selected from the group consisting of the active trivalent chromium alkanoates wherein each alkyl group contains from 1 to 20 carbon atoms; benzoate; alkylbenzoates; and alkoxybenzoates.

13. The method of claim 3 wherein the active chromium III tricarboxylate catalyst is selected from the group consisting of the active trivalent chromium alkanoates wherein each alkyl group contains from 1 to 20 carbon atoms; benzoate; alkylbenzoates; and alkoxybenzoates.

14. The method of claim 1 wherein the catalyst is active trivalent chromium oleate.

15. The method of claim 1 wherein the catalyst is active trivalent chromium 2-ethyl hexanoate.

16. The method of claim 2 wherein the catalyst is active trivalent chromium oleate.

17. The method of claim 3 wherein the catalyst is active trivalent chromium 2-ethyl hexanoate.

18. A method of catalyzing the reaction of a primary cyclic diimide with an oxirane oxygen compound which is an epoxy resin in an electron donating solvent in the presence of a catalytic amount of an active chromium III tricarboxylate having unoccupied coordination sites which comprises removing the solvent at temperatures above room temperature.

References Cited

UNITED STATES PATENTS 3,346,665  10/1967  Scharzer _____ 260—47
3,427,260  2/1969  Maguet-Martin et al. ___ 260—2

OTHER REFERENCES

Chem. Abstracts, Vol. 70, 1969, p. 97590y.

WILLIAM H. SHORT, Primary Examiner

T. E. PERTILLA, Assistant Examiner

U.S. Cl. X.R.

260—2BP, 2N, 2EC, 18Ep, 30.4Ep, 30.8Ep, 32.6Ep, 33.4Ep, 33.6Ep, 33.8Ep, 34.2, 47EC, 49, 59, 99.3A, 78SC, 94.7N, 830